Patented June 1, 1954

2,680,110

UNITED STATES PATENT OFFICE 2,680,110

COPOLYMERS OF N-METHYLOL ACRYLAMIDE

Gerard A. Loughran, Stamford, James R. Dudley, Darien, and Edward L. Kropa, Old Greenwich, Conn., assignors to American Cyanamid Company, New York, N. Y., a corporation of Maine No Drawing. Application April 17, 1952, Serial No. 282,892

11 Claims. (Cl. 260—78.5)

This invention relates to new and useful synthetic materials and methods of preparing the same. More particularly it relates to copolymers of N-methylol acrylamide with at least one unsaturated monomeric compound selected from the group consisting of alkyl acrylates, dialkyl fumarates, dialkyl maleates, N,N-dialkyl acrylamides and N-alkyl acrylamides wherein the alkyl radicals of each compound contain a total of at least 8 carbon atoms and to methods of preparing the same. Still more particularly, the invention relates to emulsion copolymers of the monomers above specified and to the emulsion copolymerization of the monomers.

It is an object of the present invention to prepare a new class of synthetic materials, more particularly resinous compositions, which have particular utility in the plastics and coating arts as such or as components of plastics and coating compositions, or as intermediates in the preparation of other resinous materials which are especially suitable for use in such fields.

Another object of the invention is to provide an economical and efficient method by which the new synthetic materials described hereinabove may be prepared.

A further and outstanding object of this invention is to prepare a new class of polymeric materials in a stable water emulsion, which emulsion is itself capable of acting as an emulsifying agent in the emulsion polymerization of various types of polymerizable compounds. These and other objects of the present invention will be discussed more fully hereinbelow.

We have found that when N-methylol acrylamide is copolymerized in aqueous emulsion with any of the class of compounds previously defined, there result emulsion copolymers having particularly desirable properties and utilities. One outstanding and unforeseen characteristic of these emulsions is that, for the most part, they cannot be coagulated by freezing or other conventional methods of coagulating and thus evidence a high degree of stability.

A particularly desirable and advantageous property of our new emulsion copolymers is that they are capable of acting as emulsifying and cross-linking agents in conventional emulsion polymerization processes such as, for instance, the emulsion polymerization of ethyl acrylate and the like. Thus, for example, a small quantity of an emulsion copolymer prepared according to the teachings of this invention can be added to a mixture of water and ethyl acrylate and the mixture may be subjected to emulsion polymerization. An advantage of such a procedure is that the polyethyl acrylate thus prepared contains, instead of a conventional water-soluble emulsifying agent, an agent which is more or less water-insoluble according to the proportion of monomeric materials used in preparing our emulsion copolymer.

The process of our invention comprises copolymerizing in water a mixture of N-methylol acrylamide with at least one of the monomeric compounds as defined hereinabove. The copolymerization may be conveniently accomplished by heating a mixture of the monomers in water while agitating. In most instances an emulsifying agent and a catalyst are desirable. The former insures the formation of a stable emulsion while the latter increases the speed of the reaction to a point which is commercially desirable.

The monomeric components of the emulsion copolymer may be considerably varied according to the properties desired. For example, if the emulsion copolymer is intended for use in a surface coating composition, it is usually desirable that baked films of the emulsion possess a maximum of toughness and elasticity with minimum water sensitivity. In such a case the optimum content of N-methylol acrylamide has been found to be approximately 5% by weight although amounts as low as 2% may be desirable in some cases. On the other hand, if the emulsion copolymers are intended for use as crease proofing or shrinkage control agents for textiles, the N-methylol acrylamide content is preferably about 50% by weight although copolymers with as high as 95% of N-methylol acrylamide, by weight, have been successfully used. In general, then, it may be stated that the ratio of monomeric components may vary from about 2 to 95% of N-methylol acrylamide and correspondingly from about 98 to 5% of the other monomeric ingredient or ingredients. The preferred range of N-methylol acrylamide content is from 5% to 50% with correspondingly about 95 to 50% of the other ingredients.

In choosing the proportions of monomeric ingredients to be copolymerized in accordance with the teachings of our invention, it is important to remember that the N-methylol acrylamide is water-soluble in both monomeric and polymeric form whereas the other monomer or monomers are water-insoluble in both monomeric and polymeric form. It is this combination of monomers, providing a balance of hydrophobic and hydrophilic substituents, which is probably responsible for the interesting properties possessed by the copolymers. The choice of proportions must accordingly be influenced by the degree of water-sensitivity desired in the copolymer. The higher the percentage of N-methylol acrylamide, the greater will be the water-sensitivity of the copolymer and vice versa.

The amount of water in the copolymerization mixture is also capable of wide variation. As little as 50% water, based on the total weight of water and monomers may be used while there is no actual limitation to the upper limit of water content, this being a practical matter governed by the desired content of solids in the emulsion copolymer.

For most of the emulsion copolymerization reactions of this invention, a suitable catalyst will be desirable in order to obtain a reaction speed which is commercially feasible. The various water-soluble per-oxygen compounds are particularly suitable in the practice of this invention. For example, the various peroxides, e. g., urea peroxide, hydrogen peroxide, potassium peroxide, sodium peroxide and the like may be used. Other suitable catalysts include sodium persulfate, potassium persulfate, sodium perborate, per-acetic acid and the like. Still other catalysts such as complex catalysts made from a ferrous or ferric salt and hydrogen peroxide as disclosed in U. S. Patent No. 2,508,341 may be used. It is also possible to employ water-insoluble oxygen-yielding catalysts such as benzoyl peroxide, tertiary butyl hydroperoxide, lauroyl peroxide, and acetyl peroxide. The concentration of catalyst employed is usually small, i. e., from about 1 to about 20 parts of catalyst per 1000 parts of the reactive mixture. If an inhibitor be present, up to 5% or even more of the catalyst may be necessary according to the concentration of the inhibitor.

As stated previously, the presence of an emulsifying agent is generally desirable, though not always necessary in the process of this invention. Suitable compatible emulsifiers which may be used may be selected from the following types: diamyl, dihexyl, or dioctyl sulfosuccinic esters and salts thereof, salts of alkylated naphthalene sulfonic acids, long chain quaternary ammonium compounds, sulfonated or sulfated higher alcohols, e. g., lauryl sulfate, the salts of the sulfonated or sulfated higher alcohols, sulfonated oils, glycol oleates and linoleates, mineral oil sulfonates, aromatic sulfonates, wax acid soaps, triethanol amine soaps such as the oleate, mono glycerol linoleate, amino sulfonates and sulfates, ammoniacal or other alkaline caseins, soaps, lecithin, cholesterol, saponin, emulsifying gums such as gum arabic, gelatin, etc.

Obviously, various mixtures of these emulsifiers and/or wetting agents may be employed in order to obtain suitable stability of the emulsions for the particular purpose for which the composition is intended. For some purposes, a quick breaking emulsion will be more desirable, while for other purposes a very stable emulsion will be required. By judiciously selecting the emulsifier, or combination of emulsifiers and the concentration thereof, an emulsion may be produced with suitable characteristics for any particular purpose. The present invention is not limited to the use of any particular proportion of emulsifying agent. In general, we prefer to use from 1 to 5 percent of the emulsifying agent based on the weight of monomers to be emulsified but commercially attractive stable emulsions may be obtained if this figure is varied from 0.1% to 25%. The optimum concentration depends primarily upon the materials to be emulsified although other factors such as agitation have a decided effect.

The temperature employed in the polymerization reaction is not critical and selection of temperature is generally controlled by the nature of the monomers to be copolymerized and on the nature of the polymer desired. However, temperatures between 20° C. and 100° C. are generally employed. Temperatures below this range generally provide a reaction rate which is too slow for practical purposes.

The emulsion polymerization reaction of this invention is preferably performed at a pH of approximate neutrality, i. e., between about pH 5.5 and 8.0. As indicated in the examples, sodium acid phosphate can be used as a buffer compound to maintain the pH of the emulsion within desired limits. However, other "buffers" such as sodium borates, oxalates and tartrates may also be used.

The following examples are given by way of explanation and not by way of limitation. Parts are by weight unless otherwise specified.

EXAMPLE 1

*Emulsion copolymerization of N-methylol acrylamide and N-octyl acrylate*

Sixty-two parts of n-octyl acrylate and 75 parts of 45% N-methylol acrylamide solution in water were mixed in an open vessel. One part of Duponol C (sodium lauryl sulfate) was added as an emulsifying agent and 0.2 part of $K_2S_2O_8$ in 25 parts of water was added as a polymerization catalyst. The entire mixture was then diluted to 500 parts with water. The mixture was buffered to a pH of 7.0 with a dilute solution of $Na_2HPO_4$. The mixture was transferred to a reaction vessel equipped with a sealed agitator and reflux condenser. The mixture was then heated to reflux with agitation and polymerization began within 15 minutes as evidenced by a sudden increase in the rate of reflux and the formation of a milky emulsion. Heating and agitation were continued for an additional hour. There resulted a thick, creamy, stable emulsion copolymer which could not be coagulated by conventional means such as by freezing, addition of methanol, addition of an inorganic salt or addition of dilute sulfuric acid.

Air-dried films of the emulsion were opaque, brittle and water-repellent.

EXAMPLE 2

*Emulsion copolymerization of N-methylol acrylamide and di-n-octyl fumarate*

Into an open vessel were introduced 113.5 parts of di-n-octyl fumarate and a solution of 33.7 parts of N-methylol acrylamide in 40 parts of water. One part of Duponol C (sodium lauryl sulfate) and 0.2 part of $K_2S_2O_8$ in 25 parts of water were added. The whole was diluted to 500 parts with water. The mixture was then buffered to a pH of 7.0 with a dilute solution of $Na_2HPO_4$ and transferred to a reaction vessel equipped with a sealed agitator and reflux condenser. The mixture was then heated to reflux with agitation. The reaction was sluggish so an additional 0.6 part of $K_2S_2O_8$ was added in increments of 0.2 part. The mixture in its final state consisted of two phases, a majority of an emulsion phase and a surface layer of oily monomer and coagulated polymer. The emulsion itself was very stable, being only partially coagulated after long standing in methanol and being unaffected by dilute sulfuric acid.

Air-dried films of the emulsion were yellow, opaque, and brittle.

Similar results were obtained when the di-n-octyl fumarate was replaced with di-n-octyl maleate.

EXAMPLE 3

*Emulsion copolymerization of N-methylol acrylamide and octadecyl acrylate*

One hundred and eight parts of octadecyl acrylate (⅓ mol) and 75 parts of a 45% solution in water of N-methylol acrylamide (⅓ mol) were mixed in an open vessel. One part of Duponol C and 0.2 part of $K_2S_2O_8$ were added. The mixture was then diluted to 500 parts with water and buffered to a pH of 7.0 with a dilute solution of $Na_2HPO_4$. The mixture was then transferred to a reaction vessel equipped with a sealed agitator and reflux condenser. The mixture was then heated to reflux with agitation. The reaction was sluggish. After two hours an additional 0.3 part of $K_2S_2O_8$ was added. After an additional hour the reaction mixture was cooled and allowed to stand 3 days, separating into 2 phases. As a result the mixture was refluxed and agitated an additional 6 hours with another portion (0.5 part) of $K_2S_2O_8$. The resulting emulsion could be coagulated by methanol but was unaffected by dilute sulfuric acid. Films of the emulsion, baked for 3 hours at 120° C., were soft and waxy.

EXAMPLE 4

*Emulsion copolymerization of N,N-di-n-butyl acrylamide and N-methylol acrylamide*

Into an open vessel were introduced 90 parts of N,N-di-n-butyl acrylamide and 10 parts of N-methylol acrylamide in aqueous 45% solution. There was then added one part of Duponol C and 0.2 part of $K_2S_2O_8$. The whole was diluted to 500 parts with water and buffered to a pH of 7.0 with a dilute solution of $Na_2HPO_4$. The mixture was then transferred to a reaction vessel equipped with a sealed agitator and reflux condenser. The mixture was refluxed under agitation. Polymerization began in 10–15 minutes and was evidenced by a brownish tinge to the reaction mixture which rapidly changed to a milky white emulsion. The emulsion was extremely stable and could be coagulated only by freezing with Dry Ice. Films of the emulsion, after baking for ½ hour at 120° C., were clear, transparent, tough, and elastic.

EXAMPLE 5

The procedure of Example 4 was followed except that the monomer content consisted of 20 parts of N-methylol acrylamide and 80 parts of N,N-di-n-butyl acrylamide. The resulting emulsion was slightly thicker than the emulsion of Example 4 but even more stable. Baked films of the emulsion were translucent and had fair elasticity.

EXAMPLE 6

The procedure of Example 4 was followed except that the monomer content consisted of 50.55 parts of N-methylol acrylamide and 91.6 parts of N,N-di-n-butyl acrylamide. During the polymerization, the emulsion became extremely thick and it was necessary to add an additional 100 parts of water. The resulting emulsion was a thick, viscous cream. Air-dried films of the emulsion were opaque and brittle.

EXAMPLE 7

*Emulsion copolymerization of N-methylol acrylamide and N,N-di-(2-ethylhexyl) acrylamide*

Into an open vessel there were placed 147.75 parts of N,N-di-(2-ethylhexyl) acrylamide and 50.55 parts of N-methylol acrylamide in 45% aqueous solution. There were added 2.0 parts of Duponol C and 5.0 parts of $K_2S_2O_8$. The whole was diluted to 1500 parts with water and buffered to a pH of 7.0 with a dilute aqueous solution of $Na_2HPO_4$. The mixture was transferred to a reaction vessel equipped with a sealed agitator and reflux condenser. The mixture was then refluxed with agitation. Polymerization began in about 30 minutes and was evidenced by formation of a brick red color followed by a fading of the color and gradual formation of a creamy liquid. A small amount of thick, sticky, semi-liquid, coagulated polymer was removed from the surface of the emulsion.

EXAMPLE 8

The procedure of Example 7 was followed except that the monomer content of the mixture consisted of 25 parts of N-methylol acrylamide and 25 parts of N,N-di-(2-ethylhexyl) acrylamide with dilution with water to 500 parts instead of 1500 parts. The resulting emulsion was a pale yellow creamy liquid which was not coagulated either by Dry Ice or by dilution with methanol. Baked films of the emulsion were hard and brittle.

The aforegoing examples describe the preparation of the copolymers of our invention. The following examples describe the application of some of these copolymers as emulsifying and cross-linking agents in conventional emulsion-polymerization reactions.

EXAMPLE 9

One-hundred (100) parts of ethyl acrylate and 153 parts of the emulsion obtained according to the procedure of Example 2 were placed in a reaction vessel equipped with a sealed agitator and reflux condenser. The mixture was diluted to 500 parts with water and buffered to a pH of 7.0 with a dilute solution of $Na_2HPO_4$. There was added 0.2 part of $K_2S_2O_8$. The mass was then heated to reflux while agitating. After a few minutes there was obtained a stable, thin emulsion. Air-dried films of the emulsion are rubbery, elastic, and tough.

EXAMPLE 10

One-hundred (100) parts of ethyl acrylate and 25 parts of the emulsion obtained in Example 1 were placed in a reaction vessel equipped with a stirrer and reflux condenser. The whole was diluted to 500 parts with demineralized water and buffered to a pH of 7 with $Na_2HPO_4$. There was then added 0.2 part of K₂S₂O₈. After heating at reflux and agitating for several minutes there resulted a milky, stable emulsion.

EXAMPLE 11

The general procedure of Example 10 was followed in polymerizing 100 parts of ethyl acrylate using 50 parts of the emulsion of Example 3 as emulsifying agent. There was obtained a thin, milky emulsion.

EXAMPLE 12

Into a reaction vessel equipped with a thermometer, reflux condenser and stirrer, there were placed 100 parts of ethyl acrylate and 50 parts of the emulsion of Example 7. The mixture was diluted with demineralized water to 500 parts and buffered to a pH of 7.0 with a dilute solution of Na₂HPO₄. There was added 0.2 part of potassium persulfate. The reaction mixture was then heated at reflux for several minutes while agitating. At the end of this time there was present a creamy, stable emulsion. Upon air-drying a thin spread of the emulsion there was obtained a tough, elastic cross-linked film.

EXAMPLE 13

The procedure of Example 12 was followed except that ethyl acrylate was replaced with an equal quantity of styrene. The resulting emulsion was very thin. Baked films of the emulsion were brittle and slightly foggy.

Illustrative examples of the monomeric compounds we can use in forming copolymers with N-methylol acrylamide are octyl acrylate, dodecyl acrylate, octadecyl acrylate, dibutyl fumarate, dioctyl fumarate, dibutyl maleate, dioctyl maleate, N-octyl acrylamide, N-octadecyl acrylamide, N,N-dibutyl acrylamide, N,N-dioctyl acrylamide, N,N-di(2-ethyl hexyl) acrylamide and the like.

The emulsion copolymers prepared according to the present invention may have pigments or dyes incorporated therein. For example, they may be colored by the addition of carbon black, iron blue, chrome yellow, lithopone, etc. Similarly, if desired, various plasticizers and/or thickeners such as water-soluble methylated cellulose ethers may also be added.

Resin emulsions prepared according to the present invention, either pigments or unpigmented, find wide application in paints, lacquers and varnishes. They may also be used to coat and/or impregnate leather, textiles, paper and other fibrous cellulosic materials. Some of the copolymers prepared according to the teachings of this invention have found utility as adhesives for plywood and similar materials. Also, as stated previously, the emulsion copolymers of this invention are particularly suitable as emulsifying agents in conventional emulsion-polymerization processes.

It will be understood, of course, that the monomeric ingredients of our novel copolymers are not limited to the monomers specified in this specification and the appended claims. Other monomers may also be present in addition to N-methylol acrylamide and the compound selected from the group consisting of alkyl acrylates, dialkyl fumarates, dialkyl maleates, N-alkyl acrylamides and N,N-dialkyl acrylamides. Such other monomers include styrene, lower alkyl esters of acrylic acid, vinyl acetate, butadiene, isoprene, allyl esters of carboxylic acids, vinyl and vinylidene chlorides, allyl alcohols, and the like.

It is our intention to cover all changes and modifications of the examples of this invention herein chosen for purposes of the disclosure, which do not constitute departure from the spirit and scope of the invention.

We claim:

1. An aqueous emulsion copolymer of from 2 to 95% by weight of N-methylol acrylamide and correspondingly from 98 to 5% by weight of a compound selected from the group consisting of alkyl acrylates, dialkyl fumarates, dialkyl maleates, N-alkyl acrylamides, and N,N-dialkyl acrylamides, the dialkyl compounds containing like alkyl groups and wherein the alkyl groups of each compound contain a total of from 8 to 18 carbon atoms.

2. An aqueous emulsion copolymer of from 5 to 80% by weight of N-methylol acrylamide and correspondingly from 95 to 20% by weight of a compound selected from the group consisting of alkyl acrylates, dialkyl fumarates, dialkyl maleates, N-alkyl acrylamides, and N,N-dialkyl acrylamides, the dialkyl compounds containing like alkyl groups and wherein the alkyl groups of each compound contain a total from 8 to 18 carbon atoms.

3. An aqueous emulsion copolymer of from 2 to 95% by weight of N-methylol acrylamide and correspondingly from 98 to 5% by weight of octyl acrylate.

4. An aqueous emulsion copolymer of from 2 to 95% by weight of N-methylol acrylamide and correspondingly from 98 to 5% by weight of N,N-dibutyl acrylamide.

5. An aqueous emulsion copolymer of from 2 to 95% by weight of N-methylol acrylamide and correspondingly from 98 to 5% by weight of di-n-octyl fumarate.

6. An aqueous emulsion copolymer of from 2 to 98% by weight of N-methylol acrylamide and correspondingly from 98 to 5% by weight of octadecyl acrylate.

7. An aqueous emulsion copolymer of from 2 to 98% by weight of N-methylol acrylamide and correspondingly from 98 to 5% by weight of N,N-di-(2-ethyl hexyl) acrylamide.

8. A process for preparing an aqueous emulsion copolymer which comprises heating a mixture in water of from 2 to 95% by weight of N-methylol acrylamide and correspondingly from 98 to 5% by weight of a compound selected from the group consisting of alkyl acrylates, dialkyl fumarates, dialkyl maleates, N-alkyl acrylamides and N,N-dialkyl acrylamides, the dialkyl compounds containing like alkyl groups and wherein the alkyl groups of each compound contain a total of from 8 to 18 carbon atoms.

9. A process for preparing an aqueous emulsion copolymer which comprises heating in water in the presence of a polymerization catalyst and an emulsifying agent a mixture of from 2 to 95% by weight of N-methylol acrylamide and correspondingly from 98 to 5% by weight of a compound selected from the group consisting of alkyl acrylates, dialkyl fumarates, dialkyl maleates, N-alkyl acrylamides, and N,N-dialkyl acrylamides, the dialkyl compounds containing like alkyl groups and wherein the alkyl groups of each compound contain a total of from 8 to 18 carbon atoms.

10. A process according to claim 9 in which the mixture is heated at a temperature between about 20°–100° C.

11. A process according to claim 9 in which the mixture comprises from 5 to 80% by weight of N-methylol acrylamide and correspondingly from 95 to 20% by weight of the compound selected from the group consisting of alkyl acrylates, dialkyl fumarates, dialkyl maleates, N-alkyl acrylamides, and N,N-dialkyl acrylamides, the dialkyl compounds containing like alkyl groups and wherein the alkyl groups of each compound contain a total of from 8 to 18 carbon atoms.

References Cited in the file of this patent

UNITED STATES PATENTS

| Number | Name | Date |
|---|---|---|
| 2,146,209 | Graves | Feb. 7, 1939 |
| 2,173,005 | Strain | Sept. 12, 1939 |
| 2,552,329 | Kropa | May 8, 1951 |
| 2,584,968 | Catlin | Feb. 12, 1952 |
| 2,598,663 | Kropa | June 3, 1952 |

FOREIGN PATENTS

| Number | Country | Date |
|---|---|---|
| 467,492 | Great Britain | June 11, 1937 |
| 827,059 | France | Jan. 18, 1938 |